US008549352B2

(12) United States Patent
Kranz et al.

(10) Patent No.: US 8,549,352 B2
(45) Date of Patent: Oct. 1, 2013

(54) INTEGRATED MICROPROCESSOR SYSTEM FOR SAFETY-CRITICAL CONTROL SYSTEMS INCLUDING A MAIN PROGRAM AND A MONITORING PROGRAM STORED IN A MEMORY DEVICE

(75) Inventors: Thomas Kranz, Rosbach (DE); Bernhard Giers, Bad Soden (DE)

(73) Assignee: Continental Teves AG & Co. oHG (DE)

( * ) Notice: Subject to any disclaimer, the term of this patent is extended or adjusted under 35 U.S.C. 154(b) by 611 days.

(21) Appl. No.: 12/679,183

(22) PCT Filed: Sep. 18, 2008

(86) PCT No.: PCT/EP2008/062489
§ 371 (c)(1),
(2), (4) Date: Aug. 23, 2010

(87) PCT Pub. No.: WO2009/040300
PCT Pub. Date: Apr. 2, 2009

(65) Prior Publication Data
US 2010/0306601 A1      Dec. 2, 2010

(30) Foreign Application Priority Data

Sep. 21, 2007   (DE) .......................... 10 2007 045 398

(51) Int. Cl.
*G06F 11/00*      (2006.01)
*G06F 11/16*      (2006.01)

(52) U.S. Cl.
USPC .............. 714/10; 714/5.11; 714/11; 714/38.1

(58) Field of Classification Search
USPC ..................... 714/5.11, 38.1, 10, 11; 726/18, 726/22; 713/166
See application file for complete search history.

(56) References Cited

U.S. PATENT DOCUMENTS

| 4,787,041 | A | 11/1988 | Yount |
| 5,222,065 | A | 6/1993 | Krogmann |
| 5,713,643 | A * | 2/1998 | Esselbrugge et al. .... 303/122.08 |
| 5,862,502 | A | 1/1999 | Giers |
| 6,201,997 | B1 | 3/2001 | Giers |
| 6,275,752 | B1 | 8/2001 | Giers |
| 6,498,403 | B1 * | 12/2002 | Hagidaira et al. ............. 307/9.1 |
| 6,502,019 | B1 | 12/2002 | Zydek et al. |
| 2003/0018860 | A1 * | 1/2003 | Krueger ........................ 711/152 |
| 2004/0255145 | A1 * | 12/2004 | Chow ............................ 713/200 |
| 2006/0161918 | A1 * | 7/2006 | Giers ............................ 718/102 |

FOREIGN PATENT DOCUMENTS

| DE | 3923432 A1 | 1/1991 |
| DE | 4341082 A1 | 6/1995 |
| DE | 19529434 A1 | 2/1997 |

(Continued)

*Primary Examiner* — Joseph Schell
(74) *Attorney, Agent, or Firm* — RatnerPrestia

(57) ABSTRACT

An integrated microprocessor system for safety-critical control systems, comprising at least two microprocessor system modules each comprising at least one processor core, a read/write memory and a memory protection unit, and a read-only memory which is jointly assigned to the processor cores of the microprocessor system modules. Each of the microprocessor system modules executes a main program and a monitoring program which may comprise a plurality of subprograms. If the memory protection unit detects unauthorized operations by one of the programs for accessing a separate address area (A, B) of another program, then the respective memory protection unit assigns a separate address area (A, B) of the read/write memory to the main program and to the monitoring program.

15 Claims, 2 Drawing Sheets

(56) References Cited

FOREIGN PATENT DOCUMENTS

| DE | 19720618 | A1 | 11/1998 |
| DE | 19800311 | A1 | 7/1999 |
| WO | WO 02/093287 | A2 | 11/2002 |

* cited by examiner

INTEGRATED MICROPROCESSOR SYSTEM FOR SAFETY-CRITICAL CONTROL SYSTEMS INCLUDING A MAIN PROGRAM AND A MONITORING PROGRAM STORED IN A MEMORY DEVICE

CROSS REFERENCE TO RELATED APPLICATIONS

This application is the U.S. national phase application of PCT International Application No. PCT/EP2008/062489, filed Sep. 18, 2008, which claims priority to German Patent Application No. 10 2007 045 398.3, filed Sep. 21, 2007, the contents of such applications being incorporated by reference herein.

BACKGROUND OF THE INVENTION

The invention relates to an integrated microprocessor system for safety-critical control systems, which microprocessor system executes at least one main program and one monitoring program, and to the use thereof in motor vehicles.

It is known to use, as a central control unit for safety-critical control systems, two complete microprocessor systems which are connected to one another, a first of which executes a main program and a second of which executes a monitoring program. Although this ensures separation between the main program and the monitoring program and substantially prevents the two programs from undesirably influencing one another, the use of two complete microprocessor systems is relatively complicated and costly, for example, in terms of the chip area, the expenditure on connections, the connection of the two microprocessor systems to one another, the separate operating systems and the power supply.

Document DE 195 29 434 A1, which is incorporated by reference, describes a microprocessor system with core redundancy for safety-critical control applications. In this known microprocessor system, two synchronously operated processor cores are provided on one or more chips which receive the same input information and execute the same program. The two processor cores are connected here by separate bus systems to the read-only memory (ROM) and to the read/write memory (RAM) as well as to input units and output units. The bus systems are connected to one another by means of driver stages or bypasses which permit the two processor cores to carry out joint reading and execution of the available data, including the checkdata and commands. The system permits a saving in terms of memory space. Only one of the two processor cores is (directly) connected to a fully-fledged read-only memory and read/write memory, while the memory capacity of the second processor core is restricted to memory locations for checkdata in conjunction with a checkdata generator. All the data can be accessed via the bypasses. As a result, the two processor cores are capable of respectively executing the entire program. This microprocessor system can also respectively execute a main program and a monitoring program in the two processor cores. However, the two programs may possibly undesirably influence one another in such a case, as a result of which in particular the reliability of the monitoring program for particularly safety-critical control operations is not sufficient.

Document WO 02/093287 A2, which is incorporated by reference, proposes a microprocessor system comprising two processor cores, to each of which in particular a read/write memory and two read-only memories are assigned, and an address comparator which compares the addresses of a processor core with fixed address areas which are assigned to a program for safety-critical functions and to a program for comfort functions.

SUMMARY OF THE INVENTION

An object of at least one aspect of the present invention is to propose a microprocessor system which both satisfies relatively stringent security requirements and reliability requirements, in particular for the execution of at least two safety-critical programs, and at the same time is also relatively cost-effective.

At least one object of the present invention is achieved by means of the integrated microprocessor system.

In one or more embodiments, the invention relates to the idea of proposing an integrated microprocessor system which substantially has the outer appearance of being a common system, in that this integrated microprocessor system has at least two microprocessor system modules which each comprise at least one processor core, one write/read memory and one memory protection unit. Each of the microprocessor modules here executes at least one main program and one monitoring program, each of which is assigned a separate address area of the respective read/write memory by the respective memory protection unit. Unauthorized memory access operations by one of the programs to the separate address areas of another program are at least detected by the respectively assigned memory protection unit.

The main program and the monitoring program are expediently safety-critical programs or comprise safety-critical functions.

The integrated microprocessor system, according to at least one aspect of the invention, can be operated with a common operating system or two substantially identical or identically designed and configured operating systems. The use of a common read-only memory is advantageous compared to the use of a plurality of read-only memories.

The integrated microprocessor system is both of redundant design and reliable with respect to substantially independent execution of the respective monitoring program. This makes it possible to prevent the sequencing of one of the monitoring programs being disrupted or undesirably influenced by the respective main program.

The respective memory protection units preferably ensure logical independence and independence with respect to the running time of the respective main program and monitoring program. The memory protection units are expediently accordingly embodied and configured.

The inventive embodiment of the integrated microprocessor system expediently permits the implementation or execution of a main program while complying with relatively stringent security requirements, this main program being composed, in particular, of different versions of subprograms and/or of subprograms which have been programmed at different times and/or according to different specifications, in particular in terms of the operational security and in terms of failure limiting values, because, in contrast with the above, at least one substantially logically independent monitoring program expediently monitors the data processing of the respective main program, wherein this is particularly preferably carried out independently of the running time.

The integrated microprocessor system is suitable, in particular, for meeting the SIL (Safety Integrity Level) 3 standard, and the corresponding requirements.

The monitoring program is preferably embodied in such a way that this monitoring program tests and evaluates the output data of the respectively assigned main program as a function of defined test algorithms, and overrules the main program, in particular in terms of the actuation of external systems, and/or prohibits undesired actuation of external systems by the main program.

The main program and/or the monitoring program expediently comprise a plurality of subprograms or subprogram modules which are, in particular, of different versions and/or origins, wherein these subprograms are particularly preferably assigned different, separate address areas of the respective read/write memory by the respective memory protection unit. As a result, undesired interference or influence by the different subprograms can be avoided, which increases the security and reliability of the microprocessor system.

The main program and the monitoring program are preferably developed and/or programmed by different development teams or different persons.

The memory protection unit is preferably embodied as a hardware unit. A memory protection unit is understood, in particular, to be a memory protection unit (MPU). The memory protection unit ensures, in particular, running-time-independent data processing of the main program and of the monitoring program as well as of possible subprograms.

The integrated microprocessor system preferably comprises a first and a second microprocessor system module which are of essentially symmetrical design, as a result of which a completely redundant system is made available.

The common read-only memory preferably comprises so much memory space that the stored data and additional checkdata, which result, in particular, from encoding of the data for troubleshooting and/or error correction, can be stored or are stored in this read-only memory. In particular, the common read-only memory has an integrated decoder unit which decodes the encoded data and makes it available in decoded form at the interface of the read-only memory and detects and/or corrects errors, and particularly preferably additionally makes available detected and/or corrected errors, arising, for example, due to external interference signals or material changes, or information about such an error or errors, at the interface of the read-only memory, as a result of which the two microprocessor system modules can take into account and/or process this information.

The microprocessor system is expediently arranged in its entirety or partially on a common chip. In particular, at least the microprocessor system modules are arranged on a common chip and are particularly preferably embodied as an ASIC. This is relatively cost-effective, in particular with respect to large production numbers.

Alternatively or additionally, individual modules or parts of the microprocessor system are preferably implemented as code, in particular as a bit code, which is used as a means of actuating a logic multi-purpose chip such as an FPGA (field-programmable gate array) or is stored thereon. In this way, it is, in particular, possible to make a saving in terms of the use of ASICs for relatively small production numbers.

When an undesired memory access operation is detected by one of the memory protection units, an interrupt routine or an exceptional handling routine (exception) is preferably started and executed, this routine aborting or interrupting the main program or subprogram carrying out this unauthorized memory access operation, and locks this main program or subprogram against further retrieval or further execution or changes defined parameters of this program or causes the microprocessor system to switch off or places at least parts of the microprocessor system in an emergency operating mode with restricted functionality or in a secure state or leaves this program in a secure state.

Alternatively, when an unauthorized memory access operation is detected, one of the memory protection units preferably prevents this memory access operation. Therefore, in particular when such an unauthorized memory access operation in the form of an imminent command which can be executed is detected before its execution, the execution of this command is prevented by the respective memory protection unit.

The microprocessor system preferably has a security module which is embodied, in particular, as a hardware module which can be actuated by the memory protection units and, at least when an unauthorized memory access operation is detected, can switch off at least parts of the microprocessor system and/or place them in an emergency operating mode with restricted functionality or place them in a secure operating state. The security module is particularly preferably configured in a particularly preferably electrically and thermally more robust fashion than the rest of the integrated microprocessor system. This is achieved, in particular, by means of the dimensioning of the electronic components.

The security module is preferably arranged on another chip.

The microprocessor system preferably has an input module/output module with a plurality of channels via which the main programs and/or the monitoring programs actuate external systems, in particular external power driver stages, wherein the monitoring programs particularly preferably have prioritized access to the input/output module compared to the main programs, or can carry out an access operation to defined channels of the input/output module only when actuation by a main program and a monitoring program occurs.

The security module preferably comprises a watchdog unit and actuates the input/output module, wherein, when an unauthorized memory access operation is detected, the security module switches off one or more channels of the input/output module and/or places than in a secure state or leaves them in a secure state.

The memory protection unit of each microprocessor system module expediently assigns the respective main program and monitoring program an additional, common address area of the read/write memory. By means of this memory area, a defined, limited and therefore relatively secure exchange of data can take place between the main program and the monitoring program. In particular, the monitoring program reads, from this memory area, the data of the main program which are necessary to execute this program.

The microprocessor system preferably has, for two microprocessor system modules, two test devices for monitoring the data processing of these two microprocessor system modules. In this context, these test devices are each connected to the processor cores and to the read/write memories, wherein the data of these test devices are compared with one another in order to determine incorrect differences. The test device permits data processing errors to be detected, and as a result of the fact that two test devices are present it is also possible for the functional capability of the two test devices to be tested and/or for the failure of one of the test devices to be compensated for.

At least one aspect of the invention relates to the use of the integrated microprocessor system in motor vehicles, in particular in a motor vehicle control system.

The integrated circuit arrangement according to aspects of the invention is provided for use in the fields of vehicle engineering, preferably motor vehicle engineering, automation engineering and control engineering. In particular, the integrated circuit arrangement is particularly preferably provided with fail-safe and/or fail-silent requirements for safety-critical applications. The integrated circuit arrangement is quite particularly preferably provided for use in electronic brake systems, control systems and airbag controllers for use in the field of motor vehicles.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
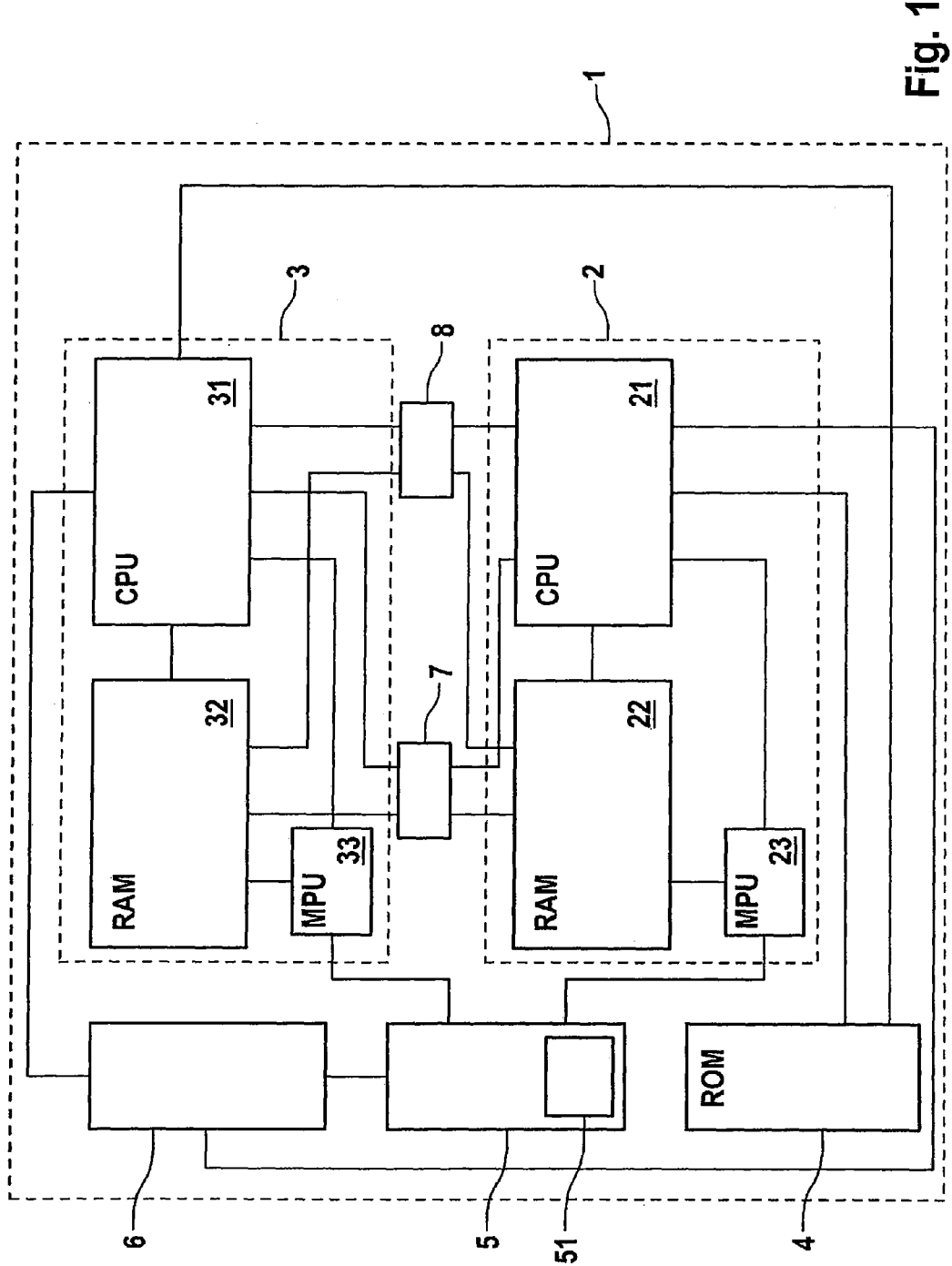
FIG. 1 shows an exemplary, integrated microprocessor system.
Figure 2:
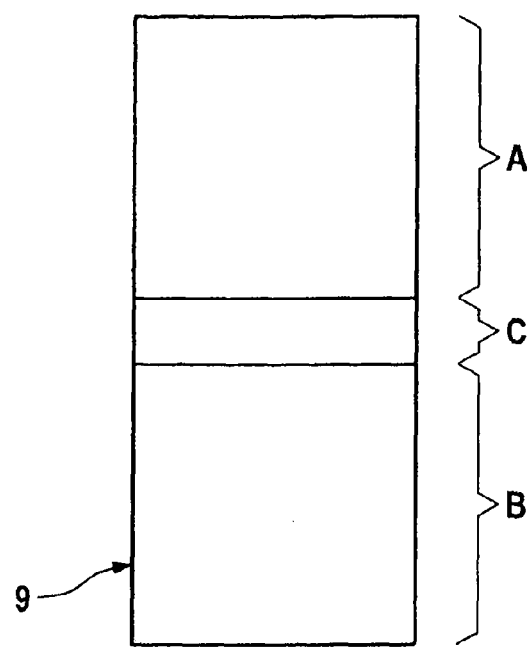
FIG. 2 shows an exemplary embodiment illustrating the address areas, assigned to the various programs, of one of the read/write memories.

FIG. 1 illustrates an exemplary embodiment of an integrated microprocessor system 1. The latter comprises two microprocessor system modules 2 and 3, which each have a processor core 21, 31, a read/write memory (RAM) 22, 32 and a memory protection unit (MPU) 23, 33. Furthermore, the integrated microprocessor system 1 also comprises a common read-only memory 4, a security module 5 with a watchdog unit 51, an input/output module 6 and two test devices 7, 8. The processor cores 21, 31 and the read/write memories 22, 32 are respectively connected to the test device 7 and test device 8. These test devices 7, 8 test the output data and therefore the data processing of the microprocessor system modules 2, 3. If there are inconsistent output data of the two microprocessor system modules 2, 3, at least one of the test devices 7, 8 causes the microprocessor system to switch off as a function of the respective non-corresponding data item or the number thereof, or the microprocessor system is placed in a secure state. Processor cores 21 and 31 are respectively connected to the read/write memory 22 or 32, the memory protection unit 23 or 33 and to the input/output module 6 as well as to the common read-only memory 4. The common read-only memory 4 comprises so much memory space that the stored data and additional checkdata which result from encoding of the data for troubleshooting and error correction are stored in the read-only memory 4. The common read-only memory 4 additionally has an integrated decoding unit which decodes the encoded data and makes it available in decoded form at the interface or the data output of the read-only memory 4, and detects errors and corrects them, if possible as a function of the Hamming distance of the code used, and detected and corrected faults, arising, for example, due to external interference signals or material changes, and/or additionally makes available information about such an error or errors at the interface of the read-only memory, as a result of which the two microprocessor system modules 2 and 3 can take into account and process this information. The memory protection units 23 and 33 are respectively connected to a read/write memory 22, 23 and a processor core 21, 31, and they assign at least the respective main program and monitoring program separate address areas A and B of the respective read/write memory 22 or 23, which are illustrated in FIG. 2, and they detect undesired memory access operations by programs to separate address areas which are assigned to other programs. When an undesired memory access operation is detected, the respective memory protection unit 23, 33 triggers an interrupt routine which prohibits this memory access operation in future, and places at least parts of the microprocessor system in a secure state or alternatively detects the undesired access operation in advance and prevents it as an additional memory access operation. The memory protection units 23 and 33 are connected to a security module 5 which, when there is an undesired memory access operation which is detected by one of the memory protection units 23, 33, switches off the microprocessor system 1 or places it in a secure state or state of restricted functionality. The security module 5 is additionally connected to an input module/output module 6 and, if an unauthorized memory access operation is detected, this security module 5 actuates this input/output module 6 in such a way that the input/output module or a defined channel of the input/output module is switched off. The input/output module 6 is also connected to processor cores 21 and 31 and can be actuated by the respective main program or monitoring program. In this context, the respective monitoring program has prioritized access or can prevent, or make ineffective, the access by the main program.

FIG. 2 illustrates, by way of example, the address areas A and B, assigned to the various programs, of one of the read/write memories. In this context, the address area A is, for example, assigned to the main program, and the address area B is assigned to the monitoring program. An undesired memory access operation is detected when the main program accesses, or wishes to access, the address area B, or the monitoring program accesses, or wishes to access, the address area A. The address area C is a common address area of the main program and monitoring program and it serves to carry out the necessary data exchange or at least to make available the output data of the main program to the respective monitoring program. The monitoring program carries out, for example, plausibility testing with respect to the actuation of external systems such as power driver stages, as a function of the data of the main program. If execution of an actuation process is not permitted, the monitoring program prevents this actuation by overruling the main program or having priority over the main program or by virtue of the fact that the main program additionally requires a corresponding actuation process via the monitoring program to actuate external systems, involving, for example, an OR logic operation being carried out on these two output signals. If an undesired memory access operation occurs, the respectively assigned memory protection unit triggers an interrupt routine or alternatively an exception handling routine (exception) which prevents this undesired memory access operation or prohibits further execution.

The invention claimed is:

1. An integrated microprocessor system for safety-critical control systems, comprising:
at least two microprocessor system modules each comprising at least one processor core, a read/write memory and a memory protection unit; and
a read-only memory which is jointly assigned to the processor cores of the microprocessor system modules,
wherein each of the microprocessor system modules executes a main program and a monitoring program, and the respective memory protection unit assigns an address area A of the read/write memory to the main program and an address area B of the read/write memory to the monitoring program, address areas A and B being separate address areas with respect to each other in the same read/write memory, and
wherein the memory protection unit detects unauthorized memory access operations by at least one of the main program attempting to access area B of the read/write memory and the monitoring program attempting to access area A of the read/write memory.

2. The microprocessor system as claimed in claim 1, wherein the main program and the monitoring program comprise a plurality of subprograms.

3. The microprocessor system as claimed in claim 1, wherein the microprocessor system comprises a first and a second microprocessor system module which are of substantially symmetrical design.

4. The microprocessor system as claimed in claim 1, wherein the microprocessor system is arranged on a common chip.

5. The microprocessor system as claimed in claim 1,
wherein, when an unauthorized memory access operation is detected by one of the memory protection units:
an interrupt routine is executed which interrupts the main program or subprogram which is carrying out this unauthorized memory access, and locks the main program or a subprogram against further retrieval or further processing, or
the interrupt routine causes the microprocessor system to be switched off or places at least parts of the microprocessor system in an emergency operating mode with restricted functionality.

6. The microprocessor system as claimed in claim 1, wherein, when an unauthorized memory access operation is detected, one of the memory protection units prevents the memory access operation.

7. The microprocessor system as claimed in claim 1, wherein the microprocessor system has a security module actuated by one of the memory protection units and, at least when an unauthorized memory access operation is detected, is configured to turn off at least parts of the microprocessor system or place them in an emergency operating mode with restricted functionality.

8. The microprocessor system as claimed in claim 7, wherein the security module is embodied as a hardware module.

9. The microprocessor system as claimed in claim 7, wherein the security module comprises a watchdog unit and actuates an input/output module, wherein, when an unauthorized memory access operation is detected, the security module performs at least one of switching off one or more channels of the input/output module and placing them in a secure state.

10. The microprocessor system as claimed in claim 1, wherein the microprocessor system has an input/output module with a plurality of channels via which the main programs and the monitoring programs actuate external systems.

11. The microprocessor system as claimed in claim 10, wherein the monitoring programs have prioritized access to the input/output module compared to the main programs.

12. The microprocessor system as claimed in claim 1, wherein the memory protection unit of each microprocessor system module assigns the respective main program and the respective monitoring program a common address area of the respective read/write memory for exchanging data.

13. The microprocessor system as claimed in claim 1, wherein the microprocessor system has two test devices for monitoring the data processing of the two microprocessor system modules, wherein the test devices are each connected to the processor cores and to the read/write memories, and the data of the test devices are compared with one another in order to determine incorrect differences.

14. The use of at least one integrated microprocessor system as claimed in claim 1 in a motor vehicles.

15. The use of at least one integrated microprocessor system as claimed in claim 1 in a motor vehicle control system.

* * * * *